W. B. HURD.
LEVELING DEVICE.
APPLICATION FILED JULY 9, 1913.
1,132,349.
Patented Mar. 16, 1915.
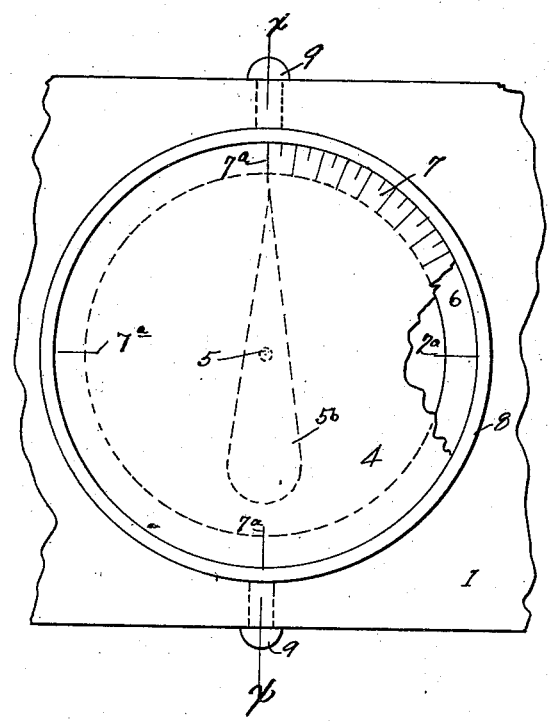
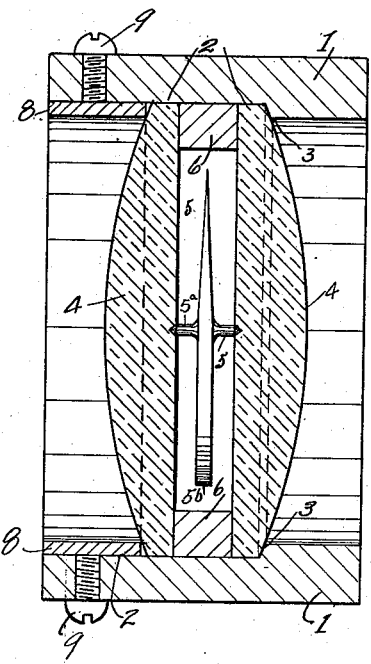
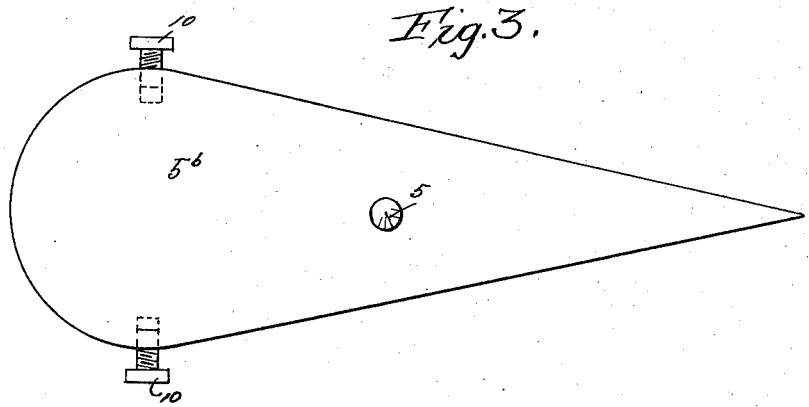
Witnesses:
Frank H. Fowler
Frances L. Fowler.
Inventor
William B. Hurd
by Fred P. Gorin
Attorney

UNITED STATES PATENT OFFICE.

WILLIAM B. HURD, OF LANGLEY, WASHINGTON.

LEVELING DEVICE.

1,132,349. Specification of Letters Patent. Patented Mar. 16, 1915.

Application filed July 9, 1913. Serial No. 778,012.

*To all whom it may concern:*

Be it known that I, WILLIAM B. HURD, a citizen of the United States, and a resident of Langley, Island county, Washington, have invented certain new and useful Improvements in Leveling Devices, of which the following is a specification.

This invention relates to leveling devices, and has for its principal object to provide a device which is exceedingly cheap and simple of construction, not likely to get out of order, and by means of which a true level may be ascertained.

Important features of the invention are:— that my device is more accurate than an ordinary spirit level; that it is less frail and liable to breakage; that it is less affected by variations of temperature.

Other features will appear as the invention is more fully described and explained in the following specification, illustrated in the accompanying drawings, and pointed out in the appended claims.

In the drawings, Figure 1 is a side elevation of my device showing a fragment of its supporting member. Fig. 2 is a sectional view of the same upon the line $x$—$x$ of Fig. 1. Fig. 3 is an enlarged detail view of a modified form of the indicator.

Referring now more particularly to the drawings, reference numeral 1 indicates the support for the device proper, and which may be of the usual material and shape as the corresponding part of an ordinary spirit level. The member 1 is bored through transversely as indicated by the outlines 2 (see Fig. 2), an annular shoulder being formed at 3 and against which abuts one of the glass or other transparent plates 4, which is centrally bored to receive one end of the arm 5, which is preferably conical at its free end, as plainly shown in Fig. 2. The opposite plate 4 is similarly bored to receive the free end of the arm $5^a$, the said arms both projecting at right angles from the indicator $5^b$ and are integral with the said indicator. Between the said plates is confined the ring 6, which is preferably of brass or other non-corroding material, and has upon both of its faces a suitable scale, such as indicated at 7, which preferably extends around both the entire circular faces of the said ring, although I have marked off the scale but a portion of that distance. These markings may represent inches but they are preferably positioned so that they divide the entire circle represented by the ring into 360 degrees, each quarter of the circle being marked off as indicated by the lines $7^a$, and each quarter containing 45 of the smaller marks of the scale 7. The bore indicated by the lines 2 is of but slightly larger diameter than that of the plates 4, so that the said plates snugly fit into the bore as seen in Fig. 2. The annular shoulder 3 holds the said plates and ring against movement toward the left as seen in Fig. 2, and the ring 8 holds the said parts in place against the said shoulder. The ring 8 loosely fits into the said bore, but is adapted to be firmly secured in its position as seen in Fig. 2, by means of the binding screws 9.

From the foregoing it is believed that the construction and operation of my device will be fully understood. It is clear that if the indicator $5^b$ have its weight equally distributed around its longitudinal axis, and the bearings for the conical portions of the arms 5 and $5^a$ be precisely in alinement with each other, the friction between the conical portions of the said arms and the corresponding bearings will be practically negligible, and the indicator $5^b$ will at all times certainly point exactly to the uppermost mark $7^a$ when the body 1 is held in a true horizontal position; that the position of the pointed end of the indicator either to the right or to the left of the said mark $7^a$ will instantly and clearly show which end of the body 1 is to be raised or lowered, as the case may be.

My device serves the purpose of a plumb as well as a level, because it is obvious that when one edge of the body 1 is placed against an exactly vertical timber or the like, the pointed end of the indicator $5^b$ will register perfectly with the mark $7^a$ which is parallel to the timber.

While I prefer and recommend that the indicator $5^b$ be either molded under pressure with its arms 5 and $5^a$ integral with it, the die or mold being made with exactness to the end that the weight around the longitudinal axis of the indicator be equally distributed, yet it is obvious that any suitable method,—such as, for example, very accurate punches and dies,—could be used to this end. The means for fastening the device proper into its support may be varied in many ways. Many other such changes will doubtless occur to others skilled in the art without departing from the spirit and scope of my invention and I therefore desire to avoid being limited to the exact form shown and described.

In the modified form of indicator shown in Fig. 3, the balancing screws 10 at each side of the heavier end of the indicator are provided, and by means of which the center of gravity of the indicator may be changed by screwing the said screws in or out as will be understood.

Having described my invention, what I claim as new and desire to protect by Letters Patent is:—

1. In an article of the class described, the combination of a main body having an aperture transversely therethrough and an annular shoulder within the aperture, plates adapted to be fitted into the aperture, a ring for holding the said plates in spaced relation to each other and an indicator pivoted between the said plates, the said indicator having its weight so distributed as to maintain it with its longitudinal axis vertical and the said ring having a scale arranged around the pivot point of the said indicator, and means for securing the said plates in position against the said annular shoulder.

2. In an article of the class described, the combination of a main body having an aperture transversely therethrough and an annular shoulder within the aperture, transparent plates adapted to be fitted flat-wise into the aperture, a ring for holding the said plates in spaced relation to each other and provided with a scale, an indicator having its weight so distributed as to maintain its longitudinal axis vertical, arms upon the indicator having conical ends adapted to revolve in corresponding apertures within the said plates, a second ring removably mounted within the aperture in the said body and which is adapted to hold the parts in position against the said annular shoulder.

WILLIAM B. HURD.

Witnesses:
FRED P. GORIN,
R. D. SMALLEY.

Copies of this patent may be obtained for five cents each, by addressing the "Commissioner of Patents, Washington, D. C."